June 27, 1950 R. E. FRAZIER 2,512,637
NOISE SUPPRESSION CIRCUIT
Filed Aug. 10, 1945
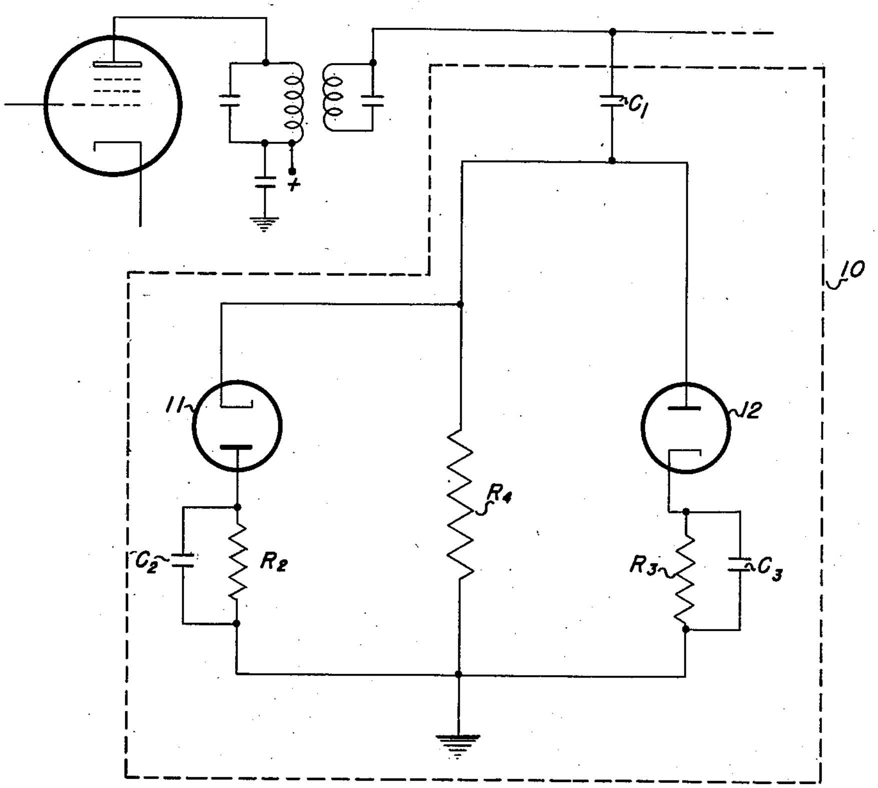
INVENTOR
RICHARD E. FRAZIER
William D. Hall.
ATTORNEY Patented June 27, 1950

2,512,637

UNITED STATES PATENT OFFICE 2,512,637

NOISE SUPPRESSION CIRCUIT

Richard E. Frazier, Dayton, Ohio, assignor to the United States of America as represented by the Secretary of War Application August 10, 1945, Serial No. 610,168

3 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to noise suppression means and is particularly suited for the suppression of impulse type noise.

One of the objects of the invention is to provide a noise suppression circuit for radio frequency amplifiers or for intermediate frequency amplifiers.

Another object of the invention is to provide a noise suppression means which presents only a small loading for radio frequencies which are continuous in nature.

Further objects and advantages of the invention will become apparent in the specification and in the accompanying drawing in which the single figure illustrates the preferred embodiment of the invention.

In the drawing the suppressor, indicated in its entirety at 10, is shown, for purposes of illustration, in the output circuit of the second intermediate frequency amplifier tube. It should be understood that the suppressor 10 may be applied at any one of many points anywhere in the radio frequency or intermediate frequency amplifier of the receiver.

The circuit to the suppressor is through condenser $C_1$ which is selected to give low reactance at the resonant frequency of the amplifier tuned circuits. Tubes 11 and 12 are diodes and may be separate tubes or a twin diode in a single envelope. The cathode of tube 11 connects to condenser $C_1$ and its plate is in the circuit $C_2$ $R_2$ grounded as shown. The plate of tube 12 is connected to condenser $C_1$ and its cathode is in the circuit of $R_3$ $C_3$ which is grounded as shown. Resistor $R_4$ connects $C_1$ to ground.

The circuit as just described, when applied to a radio frequency circuit, presents an impedance which varies according to the duration and repetition rate of the impulse of the energy applied. For radio frequencies which are continuous in nature the loading presented by this circuit is small due to the voltage built up across condensers $C_2$ and $C_3$. When power is first applied to the receive there is no voltage across condensers $C_2$ and $C_3$. However, as the carrier is received, tubes 11 and 12 are rendered conductive depending upon the polarity of the received signals. In each case, the current flow through diodes 11 and 12 charges the respective condensers $C_2$ and $C_3$. Since the R—C time constants are selected to be much greater than the period of the carrier wave, an effective bias voltage is developed across resistors $R_2$ and $R_3$ resulting from the charge across condensers $C_2$ and $C_3$. Thereafter tubes 11 and 12 will conduct only when this bias is overcome by pulses greater than the average value of the continuous radio frequency signals. These pulses result from the so-called "noise" picked up by the receiver.

The time constants of $R_2$ $C_2$ and $R_3$ $C_3$ are selected to have the best characteristics with relation to the noise that is to be suppressed and $R_2$ and $R_3$ are selected to give the least possible loading on the radio frequency circuits. Condenser $C_1$, as previously stated, assumes a value which provides a low reactance. Resistor $R_4$ is not required if all the other components are perfectly balanced; in practical circuits it is always included but usually has a high resistance.

In operation the suppressor permits the normal, continuous, radio frequency signal to pass through the usual receiver circuit without presenting an appreciable loading. The presence of noise, especially of the impulse type, causes either tube 11 or tube 12, depending on the polarity of the noise, to conduct, resulting in charging of either condenser $C_2$ or $C_3$ with ensuing dissipation of energy in resistances $R_2$ or $R_3$. If individual noise pulses are of short duration and widely separated their energy is largely stored in condensers, $C_2$ or $C_3$ and dissipated during the time between noise pulses. Inasmuch as a finite charge is required to build up a potential across $C_2$ and $C_3$ and the energy available from short duration noise is limited the circuit appears as a low impedance to voltages above the average value present. In the presence of continuous waves the circuit causes sufficient energy to be extracted from the peaks of the wave to maintain a voltage nearly equal to this peak potential across condenser $C_2$ and $C_3$.

The suppressor may be used at any point in the radio frequency or intermediate frequency circuits where the potential is of the order of one volt or more, the effectiveness of suppression increasing with the potential and peak to average ratio of noise pulses present. In actual practice the circuit described has been observed to effectively suppress noise having 10 microsecond duration and 1000 pulses per second at about 20 decibels. An important advantage of this circuit lies in its feature of automatically adjusting to suppress noise in excess of the average signal.

It is to be understood that while the invention has been described in a particular embodiment it is not intended to be limited except in accordance with the appended claims.

I claim:

1. In combination a radio receiver having a carrier frequency signal channel, a noise suppressor in shunt with said channel, said suppressor comprising a capacitor, a first diode having its anode connected to said capacitor, and a second diode having its cathode connected to said capacitor means for biasing said first diode to a voltage proportional to the average amplitude of the carrier frequency signal, said means including, a first resistance and capacitance network connected in parallel to the cathode of said first diode, and means for biasing said second diode to a voltage proportional to the average amplitude of the carrier frequency signal, said means including a second resistance and capacitance network connected in parallel to the anode of said second diode whereby said noise suppressor presents a low impedance to high amplitude, short duration signals.

2. In a noise suppressor as set forth in claim 1, a resistor connected between the capacitor and the source of reference potential in shunt with both diodes.

3. A noise signal reducing circuit comprising a receiver having a carrier frequency signal channel, a circuit having high impedance to continuous carrier wave signals and low impedance to impulse type noise signals connected in shunt with said channel, said circuit comprising a pair of rectifiers connected in opposition and a pair of self-biasing means for said rectifiers, each of said means being in series with one of said rectifiers for biasing said rectifier to a voltage proportional to the average amplitude of the carrier frequency signals.

RICHARD E. FRAZIER.

REFERENCES CITED

The following references are of record in the file of this patent:

UNITED STATES PATENTS

| Number | Name | Date |
|---|---|---|
| 1,754,557 | Hoyt Jr. | Apr. 15, 1930 |
| 2,088,210 | Koch | July 27, 1937 |
| 2,171,671 | Percival | Sept. 5, 1939 |
| 2,224,794 | Montgomery | Dec. 10, 1940 |
| 2,290,553 | Haantjes | July 21, 1942 |
| 2,342,238 | Barney | Feb. 22, 1944 |

FOREIGN PATENTS

| Number | Country | Date |
|---|---|---|
| 116,619 | Australia | Mar. 4, 1943 |